United States Patent
Wetterau et al.

(10) Patent No.: US 11,474,977 B2
(45) Date of Patent: Oct. 18, 2022

(54) SNAPSHOT ISOLATION IN A DISTRIBUTED STORAGE SYSTEM

(71) Applicant: DROPBOX, INC., San Francisco, CA (US)

(72) Inventors: David Wetterau, San Francisco, CA (US); Braden Walker, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 237 days.

(21) Appl. No.: 16/588,960

(22) Filed: Sep. 30, 2019

(65) Prior Publication Data

US 2021/0097036 A1    Apr. 1, 2021

(51) Int. Cl.
| | |
|---|---|
| G06F 16/18 | (2019.01) |
| G06F 16/182 | (2019.01) |
| G06F 11/14 | (2006.01) |
| G06F 16/14 | (2019.01) |

(52) U.S. Cl.
CPC ...... *G06F 16/1865* (2019.01); *G06F 11/1474* (2013.01); *G06F 16/144* (2019.01); *G06F 16/1824* (2019.01); *G06F 2201/84* (2013.01)

(58) Field of Classification Search
CPC . G06F 16/1865; G06F 16/144; G06F 16/1824
See application file for complete search history.

(56) References Cited

U.S. PATENT DOCUMENTS

| | | |
|---|---|---|
| 5,862,325 A | 1/1999 | Reed et al. |
| 7,340,447 B2 | 3/2008 | Ghatare |
| 7,801,912 B2 | 9/2010 | Ransil et al. |
| 8,996,482 B1 | 3/2015 | Singh et al. |

(Continued)

FOREIGN PATENT DOCUMENTS

KR    101295977 B1    8/2013

OTHER PUBLICATIONS

Shacham O., et al., "Omid, Reloaded: Scalable and Highly-Available Transaction Processing," Proceedings of the 15th USENIX Conference on File and Storage Technologies (FAST '17), Mar. 2, 2017, downloaded from https://www.usenix.org/system/files/conference/fast17/fast17-shacham.pdf, pp. 167-180.

(Continued)

*Primary Examiner* — Loc Tran
(74) *Attorney, Agent, or Firm* — Polsinelli PC

(57) ABSTRACT

Systems and methods for snapshot isolation in a distributed storage system M are provided. In some examples, a method can include receiving a request for data from a data store comprising a plurality of storage nodes, the request comprising a key associated with the data and a request timestamp, identifying a storage node in the plurality of storage nodes from which to read the data based on the key and a mapping of keys to storage nodes, determining that the request is associated with a transaction comprising operations associated with at least one other storage node in the plurality of storage nodes, determining a status of the entry for the key in the key-value table based on a lookup of a transaction table using the transaction identifier, and providing the data when the status of the entry for the key indicates the data is ready to be read.

19 Claims, 8 Drawing Sheets

(56) References Cited

U.S. PATENT DOCUMENTS

| | | |
|---|---|---|
| 9,043,372 B2 | 5/2015 | Makkar et al. |
| 9,361,408 B2 | 6/2016 | Marukame et al. |
| 9,659,038 B2 | 5/2017 | Saito et al. |
| 9,767,107 B1 | 9/2017 | Bent et al. |
| 9,805,108 B2 | 10/2017 | Merriman et al. |
| 10,075,518 B2 | 9/2018 | Basta et al. |
| 10,095,440 B2 | 10/2018 | Veeraraghavan et al. |
| 2012/0284231 A1 | 11/2012 | Basescu et al. |
| 2017/0147602 A1 | 5/2017 | Darcy et al. |
| 2018/0181606 A1 | 6/2018 | Chu |
| 2018/0260125 A1 | 9/2018 | Botes et al. |
| 2018/0329967 A1* | 11/2018 | Lee .................. G06F 16/27 |
| 2020/0117733 A1* | 4/2020 | Mueller ............ H04L 9/0637 |

OTHER PUBLICATIONS

Wolinski P.D., "Application of Distributed Shared Memory to Metadata Storage in a Parallel File System," ProQuest Dissertations, May 2005, downloaded from https://search.proquest.com/docview/305026674, 153 pages.

\* cited by examiner

FIG. 3A

300 → k-v Table

| Key | Version ID | Value | Tx ID |
|---|---|---|---|
| A123 | 7 | Foo | |
| B222 | 3 | Cat | |
| A123 | 10 | Bar | |
| A123 | 13 | Baz | 3_55 |
| C888 | 2 | Dog | |

305 points to first row; 310 points to fourth row.

FIG. 3B

325 → k-v Table

| Key | Version ID | Value/Location | Tx ID |
|---|---|---|---|
| XYZ55 | 17 | Blah | 3_55 |

330 points to the row.

FIG. 3C

350 → Tx Table

| Tx ID | State | Version ID |
|---|---|---|
| 3_55 | Committed | 17 |
| ... | | |
| | | |

360 points to the first row.

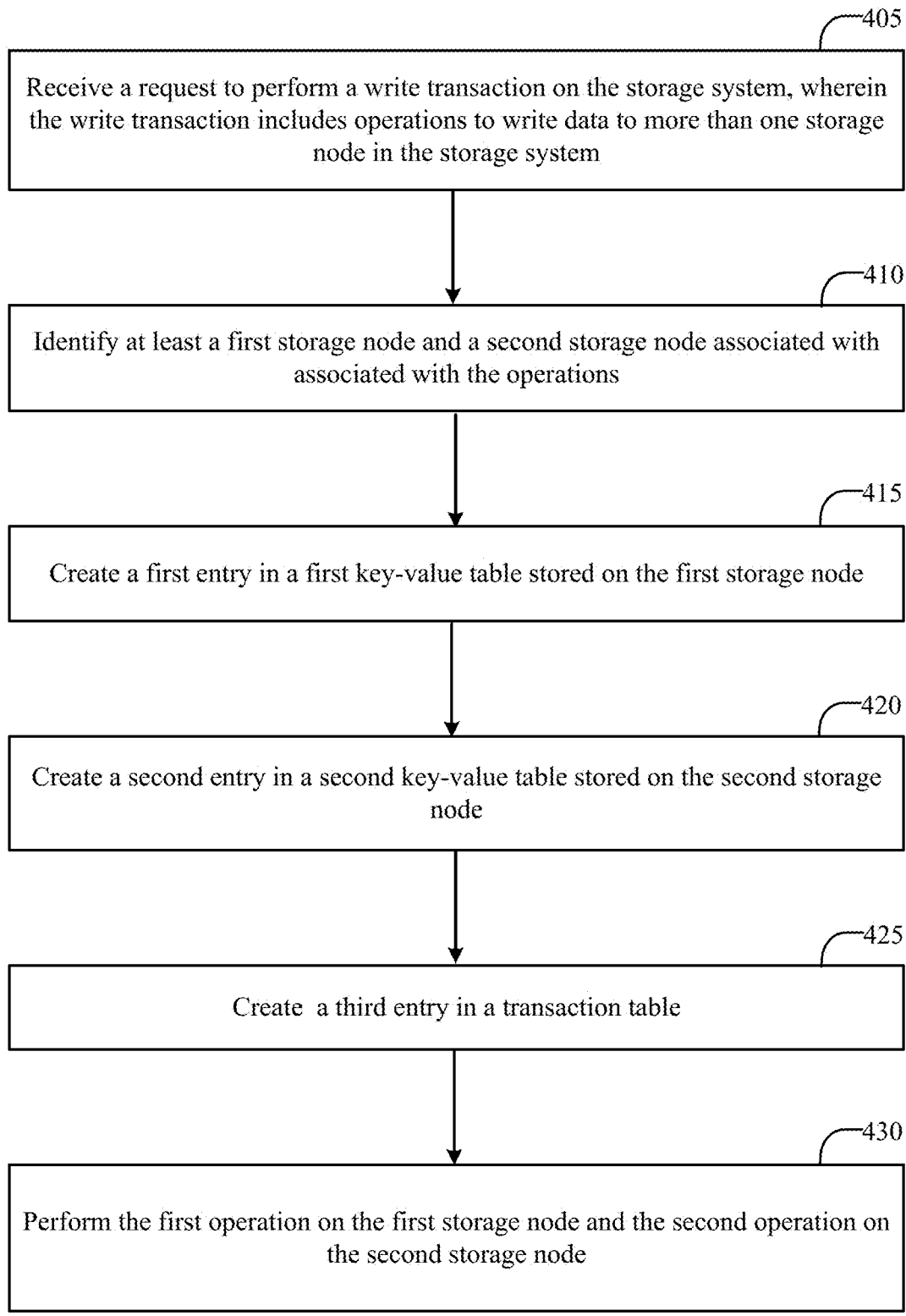

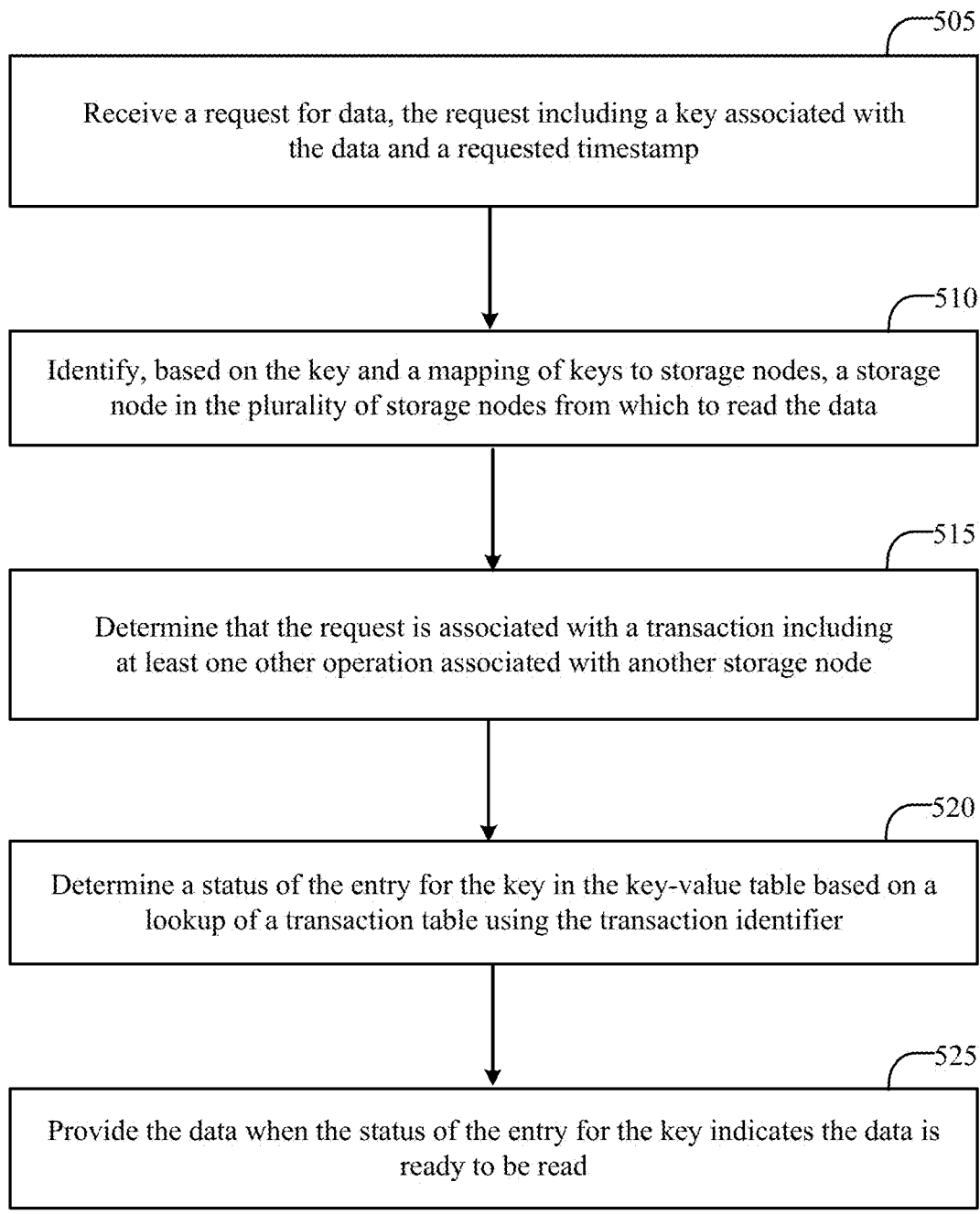

SNAPSHOT ISOLATION IN A DISTRIBUTED STORAGE SYSTEM

TECHNICAL FIELD

The present technology relates to user interfaces and the creation of digital content items.

BACKGROUND

Content management systems allow users to store and access data on the cloud. A content management system can allow users to maintain a variety of content items stored on, and accessible from, the content management system. Content management systems may also support synchronization of copies of data across a number of client devices and servers so each copy of the data is identical and locally accessible from the client devices. The synchronization functionality can enable users to store local copies of the data on their client devices and access the local copies of the data from their client devices. The local copies of the data can be synchronized with the data on the content management systems to ensure consistency between local and cloud copies of the data. The local copies of the data may provide users with faster access to the data and may allow users to access the data when their client devices are offline. Some content management systems also allow users to share data with other users and access the data in a collaborative fashion. For example, multiple users may share access to content items and edit, move, delete, or create shared content items. Content management systems store a vast amount of data for users (e.g., enterprise users, individual users, etc.) such that the data cannot conveniently be stored on one device.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIGS. 3A and 3B are diagrams illustrating example key-value tables, in accordance with various aspects of the subject technology;

FIG. 3C is a diagram illustrating an example transaction table, in accordance with various aspects of the subject technology;

FIG. 4 is a diagram illustrating an example method for performing a write transaction on a storage system, in accordance with various aspects of the subject technology;

FIG. 5 is a diagram illustrating an example method for performing a read transaction on a storage system, in accordance with various aspects of the subject technology.

DETAILED DESCRIPTION

Figure 1A:
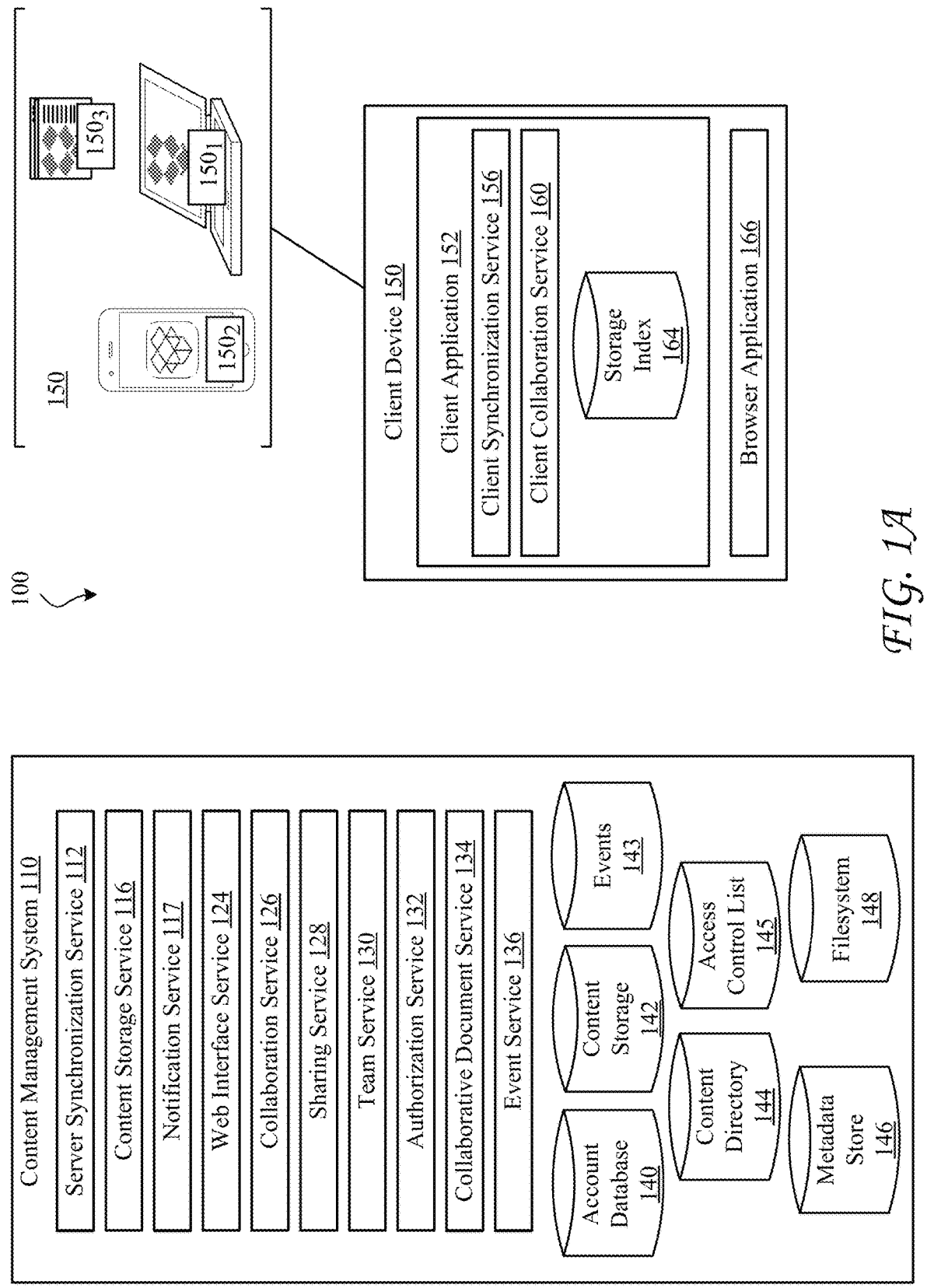
FIG. 1A shows an example configuration of a computing environment including a content management system and client devices, in accordance with various aspects of the subject technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

As noted above, content management systems store a vast amount of data for users (e.g., enterprise users, individual users, etc.) such that the data cannot conveniently be stored on one device. Instead, data may be stored across a large number of storage nodes to improve data storage and data access performance. However, the data stored in the storage nodes may need to be accessed by multiple users of the content management system and/or concurrently operated on by the multiple users with access to the data. Furthermore, data stored on one storage node may relate to data stored on other storage nodes and operations (e.g., read, write, edit, move, or delete operations) for data on one storage node may depend on operations on data on other storage nodes.

Aspects of the subject technology relate to systems and processes configured to provide efficient access to data stored across multiple storage nodes while maintaining snapshot isolation where all reads made in a transaction will experience a consistent view or "snapshot" of the data store. Various aspects of the subject technology provide for a storage system that includes a front end system and a number of storage nodes. The front end system is configured to receive client requests and coordinate with a large number of storage nodes to execute the client requests. The client requests may include various requests (e.g., read, write, edit, move, delete, or the like) associated with data stored in the various storage nodes. The data stored in the storage nodes may include, for example, files, content items, metadata associated with content items, or the like.

The front end system serves to abstract the storage nodes into a single storage space by maintaining a mapping of key ranges to storage nodes and a mapping of transaction IDs to storage nodes. Each storage node maintains a key-value table for keys in a key range assigned to the storage node as well as a transaction table for a transaction ID range assigned to the storage node. The key-value table provides entries for the values for the various versions of the keys maintained by the storage node. When a version of a key is associated with a transaction that includes a key associated with a different storage node, the entry in the key-value table includes a transaction ID.

A transaction record may be looked up using the transaction ID to determine the state of a transaction (e.g., committed or abandoned) and whether a version of the key associated with the transaction is committed yet. Based on this information, the system can determine whether the version of the key in the key-value table is ready to be served to the client or if other operations on the system must be completed before the version of the key in the key-value table is committed and ready to be served. Accordingly, the storage system enables snapshot isolation where client requests a consistent view of the data store, while still allowing for multiple users, client devices, or client applications to access the data stored on the data store. The storage system further allows for snapshot isolation where the data stored on the data store is stored on multiple storage nodes. Allowing for the data to be stored on multiple storage nodes enables a greater amount of data to be stored.

Various aspects of the disclosed technologies are deployed in the context of one or more content management systems, such as a cloud storage service, having content item synchronization capabilities and collaboration features, among others. An example configuration 100 of a content management system and environment is shown in FIG. 1A, which depicts content management system 110 interacting with client device 150, in accordance with various aspects of the subject technology.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items or objects associated with the content items or user accounts can be stored in metadata store 146. Likewise, data regarding where a content item is stored in content storage 142 can be stored in content directory 144. Additionally, data regarding changes, access, etc., can be stored in filesystem 148.

Each of the various storages/databases such as content storage 142, content directory 144, filesystem 148, and metadata store 146 can be comprised of more than one such storage or database and can be distributed over many devices and locations. Other configurations are also possible. For example, data from content storage 142, content directory 144, filesystem 148, and/or metadata store 146 may be combined into one or more content storages or databases or further segmented into additional content storages or databases. Thus, content management system 110 may include more or less storages and/or databases than shown in FIG. 1A.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function can output the same identifier for every copy of the same content item, but can output a different identifier for a different content item. Using this methodology, content storage service 116 can output a unique ID for each content item.

Content storage service 116 can also designate or record a content path for a content item in metadata store 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata store 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not necessarily correlate to storage locations of content items in content storage 142.

While the directory structure in which an account views content items does not necessarily correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata store 146, in association with the unique ID of the content item.

Content storage service 116 can also store a log of data regarding changes, access, etc., in filesystem 148. Filesystem 148 can include the unique ID of the content item and a description of the change or access action along with a time stamp or version number and any other relevant data. Filesystem 148 can also include pointers to blocks affected by the change or content item access. Content storage service can provide the ability to undo operations, by using a content item version control that tracks changes to content items, different versions of content items (including diverging version trees), and a change history that can be acquired from the filesystem 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a browser application 166, such as a web browser. For example, client device 150 can use browser application 166 to access web pages and content on content management system 110. However, client devices can also access content management system 110 using client application 152 stored and running on client device 150. Client application 152 can include a client synchronization service 156. Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update filesystem 148, metadata store 146, content directory 144, content storage 142, account database 140, etc. as appropriate.

When synchronizing from content management system 110 to client device 150, a mount, modification, addition, deletion, move of a content item recorded in filesystem 148 can trigger a notification to be sent to client device 150 using notification service 117. When client device 150 is informed of the change a request changes listed in filesystem 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which can then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 136 can generate an event for such interaction. When event service 136 detects a user interaction with a content item and/or another user, event service 136 can create an event identifier (e.g., unique event identifier) and event type, and associate the event identifier and event type with the user (e.g., user identifier and namespace identifier) to create an event or event record for the interaction. After the event is created, event service 136 can send the event identifier and any information associated with the event to events store 143 for storage.

Events store 143 can include one or more storage systems, such as one or more databases, for storing events and associated information. In some examples, events store 143 can include a distributed database or distributed storage system. Events store 143 can receive and store the event data for access by content management system 110.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item. Content management system 110 (e.g., via event service 136) and/or client device 150 can track user interactions with content, such as read or write events, and maintain a history of such events and interactions for a user (e.g., events store 143).

In some embodiments, content management system 110 can report a history of user interaction with a shared content item. Collaboration service 126 can query data sources such as events store 143, metadata store 146 and filesystem 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata store 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While configuration 100 is presented with specific components, it should be understood by one skilled in the art, that the architectural configuration of system 100 is simply one possible configuration and that other configurations with more or fewer components are possible.

Figure 1B:
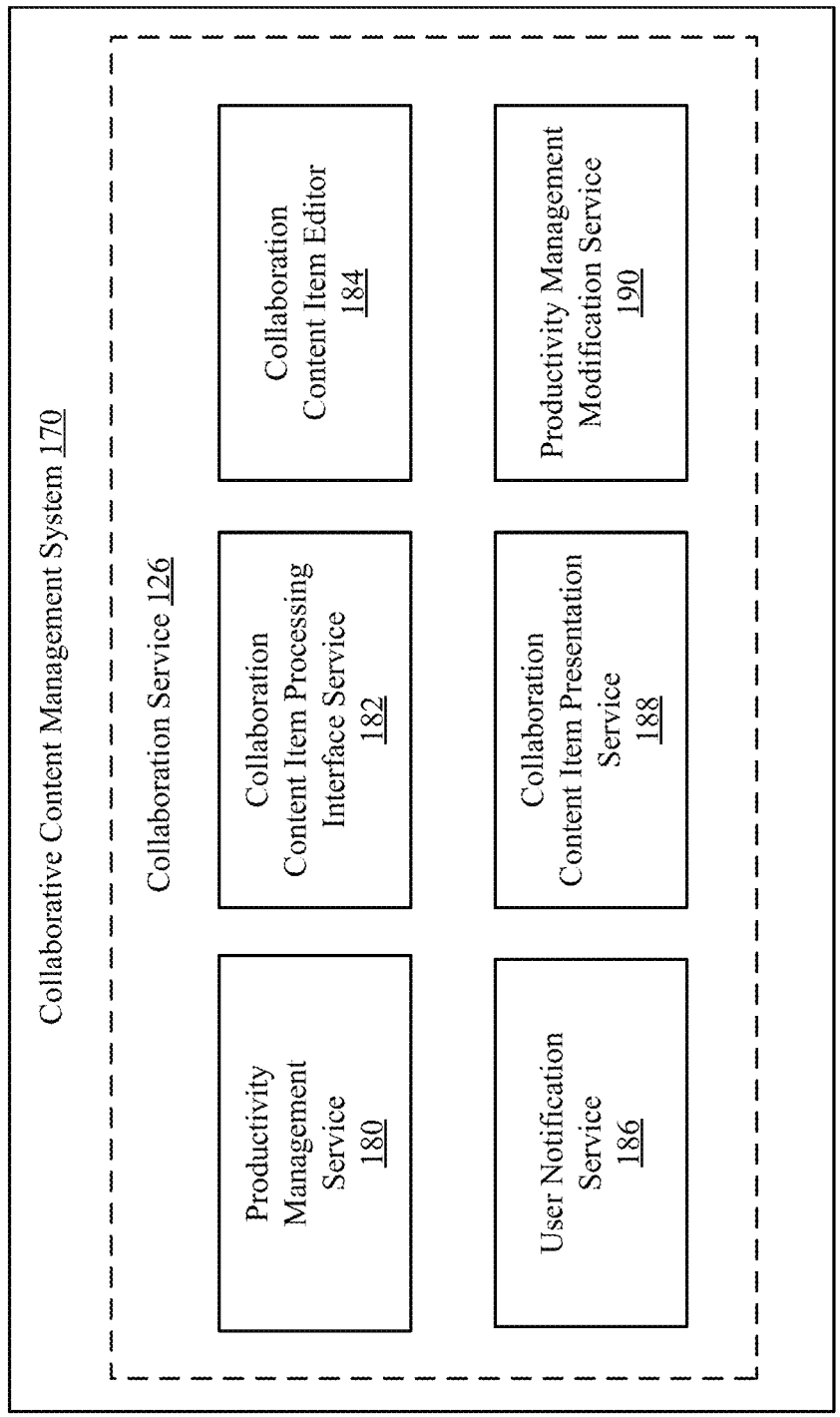
FIG. 1B shows an example collaboration content management system, in accordance with various aspects of the subject technology.

FIG. 1B shows an example collaboration content management system 170, according to some examples, in accordance with various aspects of the subject technology. Collaboration content management system 170 can include one or more servers and/or applications for hosting and running collaboration service 126. Collaboration content management system 170 can be part of content management system 110 or separate from content management system 110. For clarity and explanation purposes, collaboration content management system 170 will be described herein as part of content management system 110.

Collaboration service 126 can include one or more components and/or services. For example, collaboration service 126 may include productivity management service 180, collaboration content item processing interface service 182, collaboration content item editor 184, user notification service 186, collaboration content item presentation service 188, and productivity management modification service 190. Productivity management service 180, collaboration content item processing interface service 182, collaboration content item editor 184, user notification service 186, collaboration content item presentation service 188, and/or productivity management modification service 190 can include one or more services, components, devices, etc., such as physical servers, virtual machines, software containers, etc. Moreover, one or more of productivity management service 180, collaboration content item processing interface service 182, collaboration content item editor 184, user notification service 186, collaboration content item presentation service 188, and productivity management modification service 190 may be coupled to one another or to components not explicitly shown.

Productivity management service 180 may be configured to gather productivity data from content management system 110. In various embodiments, productivity management service 180 identifies an event and gathers information related to the event. For instance, productivity management service 180 may gather a specific calendar entry and/or a specific task from an online calendar. Productivity management service 180 may further gather information from the calendar entry or gather information related to the calendar entry such as time(s), date(s), relevant locations, title(s), agenda(s), summaries, description(s), and/or attendees related to the event. Productivity management service 180 may provide the productivity data to the other modules of collaboration service 126.

Collaboration content item processing interface service 182 may be configured to interface with collaboration service 126. In various embodiments, collaboration content item processing interface service 182 may provide collaboration content items to one or more modules of collaboration service 126, as described further herein.

Collaboration content item editor 184 may be configured to create and/or modify collaboration content items. A collaboration content item may be created in a variety of ways. In some embodiments, collaboration content item editor 184 enables creation of the collaboration content item into the content management system 106. Collaboration content item editor 184 may enable access to or be any collaboration content item editing application (e.g., Microsoft Word®, Google Docs®, or the like) either in the cloud or executed locally. In one example, content management system 106 may provide to one of client devices 150 a user interface element (e.g., a box or a button) that allows creation of a new collaboration content item.

In some embodiments, collaboration content item editor 184 may create the collaboration content item in conjunction with the productivity management service 180. For example, collaboration content item editor 184 may provide a suggestion to a user to create or invoke a collaboration content item associated with an upcoming event. In various embodiments, collaboration service 126 may identify a user that is opening or otherwise using collaboration content item editor 184. Productivity management service 180 may identify an upcoming event for the user on the user's calendar. Subsequently, collaboration content item editor 184 may provide a suggestion to the user to create or invoke the collaboration content item associated with the upcoming event.

Although it is discussed that collaboration content item editor 184 may provide a suggestion to the user to create or invoke the collaboration content item associated with the upcoming event, it can be appreciated that the suggestion to create or invoke the collaboration content item may be made by any application. For example, a user may log into and/or otherwise access any application or suite of applications. Once the user is identified and an upcoming event is identified on the user's calendar, any application may provide the user with the suggestion to create or invoke the collaboration content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaboration content item in response to the suggestion, collaboration content item editor 184 may create or invoke the requested collaboration content item. If the application that provided the suggestion to the user is not a collaboration content item editor, then a collaboration content item editor may be executed and the requested collaboration content item created and/or invoked in response to the user's request.

In accordance with some embodiments, collaboration content item editor 184 may configure the productivity management service 180 to provide access to the collaboration content item (e.g., using a link, including the collaboration content item, or any other mechanism to enable access to the collaboration content item) in a meeting request, a task entry, or the like. In some embodiments, collaboration content item editor 184 may instruct productivity management service 180 to place an icon corresponding to a link to the collaboration content item in the calendar entry, meeting request, task entry, or the like. When a user has opened the link (e.g., by clicking the icon), the user may be directly guided to the collaboration content item from the meeting request, task entry, or the like. In one example, the link in the calendar entry may provide the user (e.g., using client device 150) access to a collaboration content item stored in content management system 106 (e.g., in storage accessible through the cloud) or in productivity management service 180.

Once the user requests to create or invoke the collaboration content item, collaboration content item editor 184 may create and/or invoke a collaboration content item. The collaboration content item may be subsequently edited, altered, viewed, changed, stored, and/or the like by an editing application (e.g., either stored locally on a client device or in the cloud). In various embodiments, one or more different client devices 150 may utilize different editing applications to make changes to the collaboration content item. Collaboration content item editor 184 and/or other editing applications may allow for the collaboration content item to be changed by multiple different users using different client devices 150 at the same time or substantially at the same time (e.g., in real time or substantially in real time).

It can be appreciated that users may be automatically guided to a collaboration content item related to a calendar entry, meeting request, a task entry, or the like without human intervention. In some embodiments, users may be guided to a collaboration content item related to a calendar entry, a meeting request, a task entry, or the like without having the users separately open collaboration content item editing applications. Such functionalities may prove particularly convenient for users seeking to take, review, or collaborate on notes associated with an event, as these users need not open applications other than productivity management applications.

Collaboration content item editor 184 may receive from users additional content for the collaboration content item. For example, collaboration content item editor 184 may be configured to receive from client devices 150 changes or edits to the collaboration content item. In various embodiments, the changes may include text, characters strings, or the like. The changes may also include annotations to the collaboration content item, comments to the collaboration content item, files to be attached to the collaboration content item, pictures to be attached to the collaboration content item, links to be attached to the collaboration content item, tasks related to the collaboration content item, or the like that can be incorporated into the collaboration content item. In various embodiments, edits to the collaboration content item are collaboration. For instance, collaboration content item editor 184 may obtain edits (e.g., text changes and/or additions of audio files, pictures, tables, or the like) from any number of client devices 150 at a given time (or in real time). Collaboration edits may be incorporated in a variety of formats, including formats that provide different text attributes such as colors, fonts, styles, or the like for different users.

In various embodiments, collaboration content item editor 184 (and or a security or permissions module associated with a server) may establish permissions and/or security for the collaboration content item. For example, collaboration content item editor 184 may enable event attendees to view and/or make edits to the collaboration content item while others may not have rights to view the collaboration content items and/or make changes. Permissions and/or security may be enforced in any number of ways. However, access to the collaboration content item may, in various embodiments, be provided to attendees of the event or a subset of attendees.

In some implementations, users can enter commands by providing pre-established primitives. A primitive can be a specified sequence of one or more characters that the content management system 106 recognizes as mapped to particular functionality. In some implementations, a primitive can be followed by one or more parameters specifying how the system should implement the corresponding functionality. Examples of primitives include a user identification primitive (e.g., "@" followed by a username parameter—referred to herein as a mention of a user), a task creation primitive (e.g., "[ ]" followed by a task title parameter), an emoji selector primitive (e.g., ":"), a content item selector and reference insertion primitive (e.g., "+" followed by at contentItem title parameter), a bullet list primitive (e.g., "*"), etc. Primitive parameters can define the corresponding functionality in various ways.

For example, the + primitive can operate by taking the content specified by a contentItemTitle parameter and attempting to match it to an existing content item. In some implementations, when such a match is found, the primitive, and any associated parameter, can be replaced in the collaboration content item with a reference to the content item, such as a URL. Such a reference, when activated, can load the referenced collaboration content item. In some implementations, a primitive can take another primitive as a parameter. For example, the content "[ ] @Jane" can be interpreted such that @Jane links to a user with the username "Jane," and this link is used by the primitive "[ ]" to creates a new task, where that task is assigned to the user Jane.

In various embodiments, collaborative content item editor 184 (and or a security or permissions module associated with a server) may establish permissions and/or security for the collaborative content item. For example, collaborative content item editor 184 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaboration content item is limited based on storage access rights. For example, a user with access rights to cloud storage may access, view, and/or make changes to the collaboration content item. In some embodiments, a user with access rights assigned by the content management system 106 may access, view, and/or make changes to the collaboration content item.

User notification service 186 may be configured to notify users of each of client devices 150 of information related to the state and/or contents of the collaboration content item. Notifications may be sent, for example as an email notification, a chat message notification, a notification in a display of the collaboration content item, or in relation to the collaboration content item through a file system or other organizational system. In various embodiments, user notification service 186 provides notifications about changes to client devices 150. For example, user notification service 186 may notify users whether a collaboration content item has been created for an event. As another example, user notification service 186 may notify specific users that they have been invited to attend an event.

Collaboration content item presentation service 188 may provide to client devices 150 selected collaboration content items. The collaboration content items may be displayed in client devices 150 through a native application, an Internet browsing window, or the like supported by client devices 150.

It can be appreciated that collaboration content item presentation service 188 may restrict writing permissions to the collaboration content items at any time. In an example, prior to occurrence of the event, collaboration content item presentation service 188 may restrict writing permissions to the collaboration content item (and turn the collaboration content item into a read-only collaboration content item) for all users except the creator or invoker of the collaboration content item. In some embodiments, the creator or invoker of the collaboration content item may select a subset of recipients to receive writing permissions.

Collaboration content item presentation service 188 may also support a collaboration content item viewing portal users can use to view existing collaboration content items. The collaboration content item viewing portal may order specific collaboration content items based on one or more ordering factors. "Ordering factors," as used herein, may include any factors used to order collaboration content items. Ordering factors can include factors used to order collaboration content items chronologically. More specifically, in some embodiments, the collaboration content item viewing portal orders collaboration content items according to the date(s) and/or times the collaboration content items were created. The collaboration content item viewing portal may also order collaboration content items according to the date(s) and/or time(s) the collaboration content items were edited. In various embodiments, the collaboration content item viewing portal orders collaboration content items according to the date(s) and/or time(s) of corresponding events to which the collaboration content items were related. Ordering factors can also include factors used to order collaboration content items according to the preferences of a specific user, such as whether the user has accepted events to which the collaboration content items were related.

In some embodiments, a collaboration content item viewing portal may be dedicated to a particular user who has received access to the collaboration content item because the particular user was related to an event. The user's collaboration content item viewing portal may provide access to any number of collaboration content items including the collaboration content item. The collaboration content items represented in the collaboration content item viewing portal may be ordered in any number of ways. For example, the collaboration content item viewing portal may order collaboration content items based on date and time of corresponding events.

The collaboration content item viewing portal may support search functions. For instance, the collaboration content item viewing portal may enable or allow searching for collaboration content items according to textual strings, titles, event attendees, and/or other attributes. The search functions may allow a specific user to search one or more collaboration content items for that user or for other users.

In some embodiments, productivity management modification service 190 may be configured to coordinate collaboration content items with calendar entries and to enable access to the collaboration content item through calendar entries.

Figure 2:
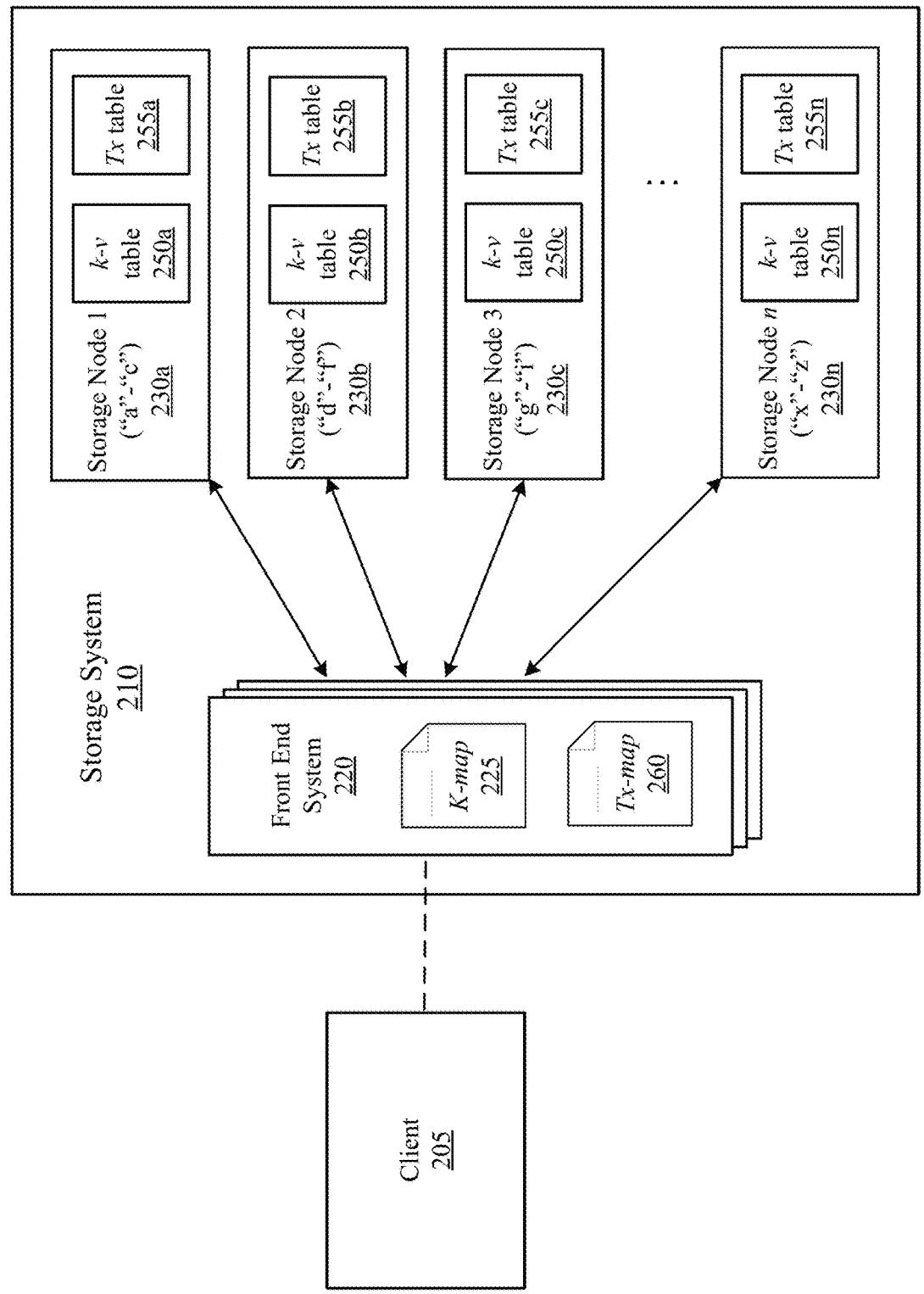
FIG. 2 shows a schematic diagram of example architecture for storing data for content management system 110, in accordance with various aspects of the subject technology.

FIG. 2 shows a schematic diagram of example architecture for storing data for content management system 110, in accordance with various aspects of the subject technology. In this example, client 205 interacts with storage system 210 to access data or to execute client requests. The storage system 210 includes a front end system 220 (otherwise referred to as the "front end") that includes one or more front end modules, and one or more storage nodes 230a-230n (referred to generally as storage node 230 or collectively as storage nodes 230).

According to some embodiments, the storage system 210 may be embodied in content management system 110 of FIG. 1. In particular, the front end system 220 may be, for example, the content storage service 116 of FIG. 1 and the storage nodes 230 may be a part of any, all, or a combination of content storage 142, metadata store 146, account database 140, events 143, content directory 144, access control list 145, or file system 148. The client 205 may be one or more of the other services on content management system 110 of FIG. 1 or an external client device 150 or client application 152.

The front end system 220 is configured to receive client requests and coordinate with the storage nodes 230 to execute the client requests. The client requests may include various requests (e.g., read, write, edit, move, delete, or the like) associated with data stored in the various storage nodes 230. The data stored in the storage nodes 230 may include, for example, content items (e.g., files, documents, images, spreadsheets, collaborative documents, etc.), metadata associated with content items, or any other information stored by the content management system 110. The metadata associated with content items may include, for example, comments, content listings, change histories, user or team privileges, content item information, or the like.

Each object or piece of data stored by the storage system 210 may be embodied as a key/value pair where the key identifies the object or the piece of data and the value stores the content of the object or piece of data. The key may, for example, be an object identifier (e.g., a 64 bit number or string) that uniquely identifies the piece of data. Each object or piece of data stored by the storage system 210 may also be associated with a sharding value. The sharding value helps in determining which storage node 230 the object is stored.

According to some embodiments, the sharding value may be a separate field from the key/value pair such as a data header, tag, or other associated information. In some embodiments, the sharding value may be found within or determined based on the key or object identifier of the piece of data to be stored. For example, the sharding value may be the first portion or prefix of the object identifier (e.g., the first 16 bits of a 64 bit object identifier). As a result, the key can also help in determining which storage node 230 the object is stored on. For the purposes of illustration, various embodiments are discussed with respect to keys or key ranges. These embodiments are similarly applicable to sharding values and sharding ranges and vice versa, as the sharding values are also associated with an object and may be included in an object's key.

When an object is created, the front end system 220 may be configured to generate a key and/or sharding value for the object. The key and/or sharding value of the object may be used to determine which storage node 230 the object is to be stored or from which storage node 230 the object is to be retrieved. For example, each storage node 230 may be configured to store a range of keys or sharding values. By assigning storage nodes a range of keys or sharding values, the front end system 220 is able to quickly determine which storage node 230 data should be stored in and, as a result, increase the speed of retrieving the data.

As an illustrative example, FIG. 2 shows a first storage node 230a that stores a key or sharding range from "a" to "c," a second storage node 230b that stores a key or sharding range from "d" to "f," another storage node 230c that stores a key or sharding range from "g" to "i," and additional storage nodes 230 that cover additional ranges of sharding values until storage node 230n that stores a key or sharding range from "x" to "z." FIG. 2 shows the ranges as between two letter values for illustrative purposes. Various embodiments may use other ranges of values.

The front end system 220 maintains a mapping 225 of key or sharding ranges to storage nodes that can be used to determine on which storage node 230 objects are stored. Based on the mapping 225 of key or sharding ranges to storage nodes, the front end system 220 can abstract the client's view of the storage system 210 into a single storage space. In other embodiments, a mapping of specific key or sharding values to storage nodes, hashing or modulus functions, or other implementations may be used to associate key or sharding values to storage nodes. In practice, these ranges may be for any range of sharding value (e.g., a 16 bit identifier) or key. Furthermore, these ranges need not have the same range size or be static. Each storage node 230 may include a memory or storage for storing objects (e.g., content items, metadata, or other pieces of data). In some embodiments, the memory or storage may include a key-value table 250a-250n for keys (or sharding values) in the range assigned to the storage node 230.

In some implementations, the front end system 220 includes a control plane configured to dynamically map objects to storage nodes, migrate objects from one set of storage nodes to another, split objects stored on a storage node onto an additional storage node or two or more other storage nodes, consolidate objects stored on multiple storage nodes onto one storage node (or fewer storage nodes) or perform any combination of these and other operations. After completing some of the operations, the control plane updates the mapping 225 of key or sharding ranges to storage nodes.

Accordingly, large amounts of data can be stored by a content management system 110 using storage system 210, where the data can be distributed across multiple storage nodes 230 to improve storage capacity and data access performance. However, the data stored in the storage nodes 230 may need to be accessed by multiple users of the content management system 110 and/or concurrently operated on by the multiple users with access to the data. Furthermore, data stored on one storage node may relate to data stored on other storage nodes, and operations (e.g., read, write, edit, move, or delete operations) for data on one storage node may depend on operations on data on other storage nodes.

As an example scenario for illustrative purposes, a user may move one or more content items from one shared folder (e.g., a source folder) to another shared folder (e.g., a destination folder). This move operation may cause the content items or related data to be copied from a first set of storage nodes to a second set of storage nodes and deleted from the first set storage nodes in a consistent manner (e.g., using an atomic operation and/or two phase commit protocol). However, the source folder, the destination folder, and/or each of the content items may have different access privileges for different users and the source folder, and/or the destination folder may be accessed by other users (e.g., editing, deleting, or viewing content items) while the move operation is occurring. Ideally, the content item access operations by the other users also should be consistent and isolated from other atomic operation. However, in practice, it is difficult for systems to maintain a consistent view of the data store before, during, and after operations because the data may be stored on one or more distributed storage nodes and may be accessed by multiple different users concurrently or within a short time span.

Aspects of the subject technology relate to systems and processes configured to maintain snapshot isolation where all data accesses (e.g., read operations, write operations, or the like) made in a transaction can experience a consistent view or "snapshot" of the data store. As is discussed in further detail, snapshot isolation may be maintained by tracking version identifiers and transaction identifiers using modified key-value tables (referred to generally as key-value table 250 or collectively as key-value tables 250) and transaction tables (referred to generally as transaction table 255 or collectively as transaction tables 255) stored by the storage nodes 230. As shown in FIG. 2, each storage node 230 may include a key-value table 250 and transaction table 255.

FIGS. 3A and 3B are diagrams illustrating example key-value tables in accordance with various aspects of the subject technology. The key-value table 300 in FIG. 3A may be key-value table 250a for the storage node 230a in FIG. 2, which is configured to store objects associated with a key or sharding range from "a" to "c." Accordingly, all the key values in the key column of key-value table 300 begin with a character "a" to "c." As previously noted, the range between two letter values is for illustrative purposes only, and the sharding value may be a part of the key of an object (e.g., the first 16 bits) or separate from the key of the object. The value column of the key-value table 300 includes the value or data stored for the object. In some embodiments, a location of the data stored on the storage node may be used instead of the actual value.

The version identifier (ID) identifies the version of an object that the value corresponds to. An object's value may be edited and updated over time and it may take some time for a write operation associated with an object to complete. In some cases, the object's version must be tracked so that a version of the object may be served to the client that is consistent with the client's request. The version identifier may be in the form of an incremented number or value or, in some embodiments, a timestamp associated with the system clock of the storage node when instructions for the write operation for the object were received. The storage node may track the progress of the write operation based on the version ID.

Figure 3D:
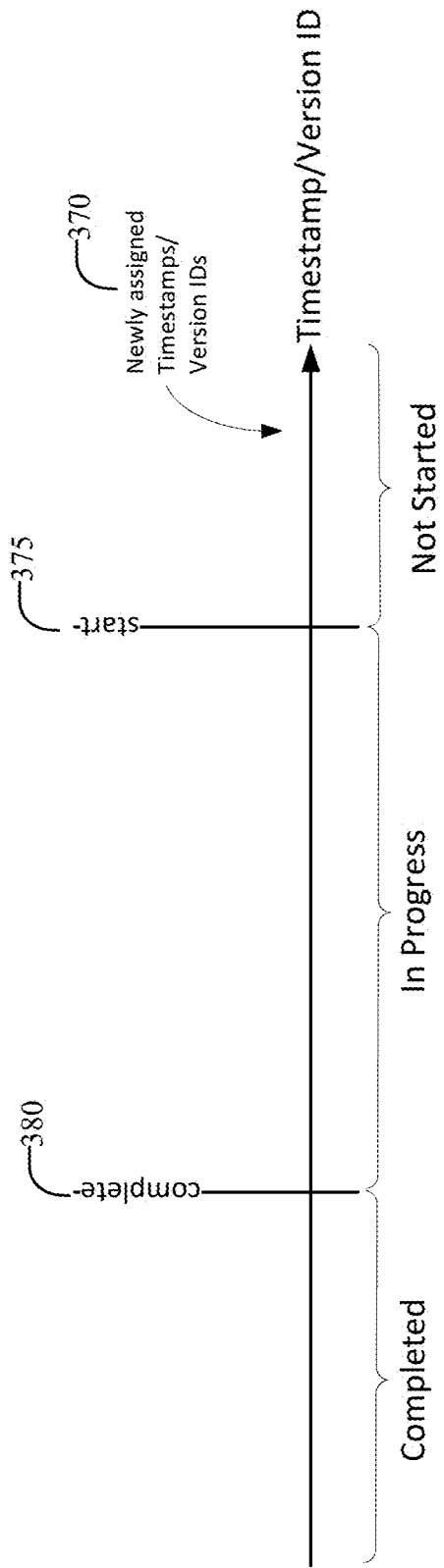
FIG. 3D is a diagram illustrating concepts of tracking progress using a version identifier (ID), in accordance with various aspects of the subject technology.

FIG. 3D is a diagram illustrating concepts of tracking progress using a version identifier (ID), in accordance with various aspects of the subject technology. FIG. 3D provides a conceptual and visual representation of the tracking process and may be implemented in various ways. Each storage node 230 may track the progress of write operations using version IDs associated with the write operations. A number of write operations may be received and they may be executed in a queue. For example, when a write operation is received by the storage node 230, the storage node 230 may assign the operation a version ID and create an entry in the key-value table 250 for the operation.

At 370 of FIG. 3D, we can see the assignment of a new version ID to a write operation in a queue. As the storage node 230 begins processing each write operation, the storage node 230 may move the start marker 375 past the version ID of the write operation. Accordingly, operations associated with version IDs higher than the start marker 375 have not been started yet and operations associated with version IDs lower than the start marker 375 are in progress. Furthermore, as the storage node 230 completes processing each write operation, the storage node 230 may move the complete marker 380 past the version ID of the write operation. Operations associated with version IDs higher than the complete marker 380 have not been completed and operations associated with version IDs lower than the complete marker 380 have been completed. According to some embodiments, the start marker 375 may correspond to, for example, a version ID or timestamp associated with the most recent operation that was started. Similarly, the complete marker 380 may correspond to a version ID or timestamp associated with the most recent operation that was completed.

In various embodiments a storage node 230 is configured to provide a version of an object in an entry in the key-value table 250 when the completed marker 380 of the storage node 230 reaches or exceeds the version ID or timestamp for that entry. For example, the object represented by the entry in row 305 of FIG. 3A with version ID of 7 is ready for reading once the complete marker 380 of the storage node 230 reaches 7.

In an example write scenario, a client 205 may request to write the value "Foo" to an object with key "A123." The front end system 220 can determine that the value is to be stored on storage node 230a based on the key (or at least the sharding value portion of the key, such as the first character "A" in this example). The front end system 220 can forward the request to storage node 230a and the storage node 230a can write the value of "Foo" to the object with key "A123" in the key-value table 300. The storage node 230a can also include a timestamp corresponding to the time that the entry in the key-value table was made.

In an example read scenario, if a client 205 requests the value of key "A123" at timestamp 9, the front end system 220 is able to determine, based on the key (or at least the sharding value portion of the key) that the value of key "A123" is stored on storage node 230a. The front end system 220 can forward the request to storage node 230a and the storage node 230a can retrieve the value of key "A123" from the key-value table 300 using the highest version ID that is less than the request timestamp of 9. In the key-value table 300 of FIG. 3A, highest version ID for key "A123" that is less than the request timestamp of 9 is the row 305 for version ID 7. If the complete marker 380 for the storage node 230a is less than 7, the operation for row 305 is not complete and the storage node 230a can wait until the operation is completed. If the complete marker 380 for the storage node 230a is at or above 7, the operation for row 305 has been completed and the storage node 230a can retrieve the value "Foo" and transmit a response with the value to the front end system 220. The front end system 220 can pass the retrieve the value "Foo" to the client 205 in a response.

The transaction identifier (Tx ID) in key-value table 300 is used to keep track of write or commit operations that involve more than one storage node 230. For example, if a write operation requested by a client 205 requires operations on two or more nodes, the entries for each of those operations in the key-value tables on the two or more nodes may include a common transaction identifier in their respective key-value tables. An entry in a transaction table (Tx table) that includes the transaction identifier may also be used to keep track of the status of the request and can be used to determine whether all operations on all storage nodes for a request are completed.

In an example write scenario, a client 205 may transmit a request to perform a write transaction to the storage system 210. The front end 220 of the storage system 210 may receive the request and determine that the transaction includes operations to write data to more than one storage node 230 in the storage system 210. For example, if the request includes a write to an existing object, the key and/or sharding value for the object may be provided in the request. The front end system 220 may look up the key and/or sharding value in the mapping 225 of key or sharding ranges to storage nodes to determine which node or nodes the write to the object is to be performed on. If the request includes a write to a new object, the front end system 220 may generate a new sharding value and/or key for the object and, based on the mapping 225 of key or sharding ranges to storage nodes and the new sharding value and/or key, determine which node or nodes the object is stored on.

Once the front end system 220 determines which storage nodes 230 are to be involved in executing the requested write transaction, the front end system 220 generates appropriate instructions to each of the storage nodes 230. For each storage node 230, the instructions may specify the key and value to be written for the object assigned to the storage node 230, as well as a transaction identifier (ID). The transaction ID may be the same in each of the instructions sent to the different storage nodes 230 such that the entries in the key-value tables 250 of the storage nodes 230 may reflect that they were all involved in the same atomic transaction.

The front end system 220 may transmit the instructions to each of the storage nodes 230 involved in executing the requested write transaction. Each storage node 230 that receives the instructions creates an entry in its key-value table 250 for the specified key that includes the value that was written, the common transaction ID (if provided in the instructions), and a timestamp or version identifier. Transaction IDs for transactions that require more than one storage node 230 may be tracked in one or more transaction tables. For example, referring back to FIG. 2, each storage node 230 is shown including a transaction table 255.

FIG. 3C is a diagram illustrating an example transaction table 350 in accordance with various aspects of the subject technology. The entries in the transaction table 350 include a transaction ID (Tx ID), a transaction state, and a version ID. The transaction ID tracks a transaction that requires multiple storage nodes 230 in the storage system 210 and it may be used to lookup transaction IDs in key-value tables 250 in storage nodes 230. The transaction state tracks the progress of the transaction and may include descriptors such as "committed," "aborted," "in progress," or the like. The version ID in the transaction table 350 specifies the highest version ID (or timestamp) that is associated with the transaction ID in any of the key-value tables 250 in storage nodes 230 involved in the transaction.

The various transaction tables 255*a*-255*n* on the storage nodes 230*a*-230*n* may be assigned different transaction IDs for tracking. A transaction map 260 maintained by the front end system 220 may be configured to track the mapping of transaction IDs to transaction tables 255 on the various storage nodes 230. In some embodiments, a transaction table 255 may be assigned a range of transaction IDs by the front end system 220.

FIG. 4 is a diagram illustrating an example method for performing a write transaction on a storage system, in accordance with various aspects of the subject technology. Although the various steps are shown in one order, alternative steps, additional steps, or fewer steps may also be implemented. Furthermore, the steps may be performed in different orders or in parallel. The various steps described with respect are discussed in conjunction with an example scenario for illustrative purposes and is not meant to be limiting. A client 205 may transmit a request to perform a write transaction to the storage system 210.

At step 405, the front end 220 of the storage system 210 receives the request and determines that that the requested write transaction involves operations to write data to more than one storage node 230 in the storage system 210. For example, if the request includes a write to an existing object, the key and/or sharding value for the object may be provided in the request. The front end system 220 may look up the key and/or sharding value in the mapping 225 of key or sharding ranges to storage nodes to determine which node or nodes the write to the object is to be performed on. If the request includes a write to a new object, the front end system 220 may generate a new sharding value and/or key for the object and, based on the mapping 225 of key or sharding ranges to storage nodes and the new sharding value and/or key, determine which node or nodes the object is stored on.

Based on the key and/or sharding value associated with the operations, the front end system 220 identifies the storage nodes 230 (e.g., at least a first storage node and a second storage node) that are to be involved in executing the requested write transaction at step 410. For each of the identified storage nodes, the front end system 220 generates appropriate instructions for write operations to be performed on the storage node. The instructions may specify the key and value for the object to be written, as well as a transaction identifier (ID) for the transaction. The transaction ID may be generated by the front end system 220 for the transaction and be included in each of the instructions sent to the different storage nodes 230 such that the entries in the key-value tables 250 of the storage nodes 230 may reflect that they were all involved in the same transaction.

The front end system 220 may transmit the instructions to each of the two or more storage nodes 230 involved in executing the requested write transaction. In an example scenario, two of the storage nodes involved in executing the requested write transaction may be storage node 1 230*a* and storage node n 230*n* of FIG. 2. Storage node 1 230*a* may be configured to store objects with key or sharding value from "a" to "c" while storage node n 230*n* may be configured to store objects with key or sharding value from "x" to "z."

Each storage node 230 that receives the instructions creates an entry in their key-value table 250 for the specified key that includes the value that was written, the common transaction ID provided in the instructions, and a timestamp or version identifier. For example, at step 415, storage node 1 230*a* may create, for the first operation, a first entry in a first key-value table 250*a* stored on the first storage node. The key-value table 300 in FIG. 3A helps illustrate the entry that may be created in an example embodiment. Since storage node 1 230*a* in FIG. 2 is configured to store objects associated with a key or sharding range from "a" to "c," all the key values in the key column of key-value table 300 begin with a character "a" to "c." The entry created in step 415 may be seen in row 310 of key-value table 300. Row 310 of key-value table 300 includes the key of the object to be written to, the value to be written, a version identifier (or timestamp) for the write operation, and a transaction identifier of "3_55" associated with the requested write transaction.

Similarly, at step 420, storage node n 230n creates, for the second operation, an entry in its key-value table 250n stored on the storage node n 230n. The key-value table 325 in FIG. 3B helps illustrate the entry that may be created in an example embodiment. The entry created in step 420 may be seen in row 330 of key-value table 325. Row 330 of key-value table 325 includes the key of the object to be written to, the value to be written, a version identifier (or timestamp) for the write operation, and the same transaction identifier of "3_55" associated with the requested write transaction.

To track the status of the transaction, an entry with the transaction's associated transaction ID is stored in one of the transaction tables 255 of the storage node. The front end system 220 may determine which transaction table 255 to store the entry by using the transaction map 260 which maintains a mapping of transaction IDs to transaction tables 255 on the various storage nodes 230. The front end system 220 identifies the appropriate transaction table 255 and transmits instructions to the storage node 230 storing the transaction table 255 to create the entry in the transaction table 255. The storage node 230 may be one of the storage nodes 230 involved in the transaction (e.g., storage node 1 230a or storage node n 230n) or a different storage node 230.

At step 425, the storage node 230 that stores the appropriate transaction table 255 receives the instructions and creates an entry in a transaction table 255 for the transaction. The entry includes the transaction ID for the transaction (e.g., "3_55"), a timestamp or version ID for the transaction, and a status or state of the transaction (e.g., started, in progress, failed, committed, or the like). The timestamp or version ID for the transaction that is included in the entry is the highest timestamp or version ID provided to any of the operations of the transaction by any storage node 230 involved in the transaction. For example, as shown in row 310 in FIG. 3A, the entry for the operation on object "A123" is given a timestamp or version ID of 13 while in row 330 in FIG. 3B, the entry for the operation on object "XYZ55" is given a timestamp or version ID of 17. Accordingly, the timestamp or version ID given to the transaction in the transaction table 225 is the highest of the two or 17. An example entry in the transaction table is provided in row 360 of FIG. 3C for illustration.

At step 430 the write operations are performed on the storage nodes 230. The write operations for each node may start, execute, and complete independently. Once all operations that are part of the write transaction are complete, the write transaction is complete. As the execution of the write transaction progresses, the entry in the transaction table 255 for the transaction may be have its status or state updated. Upon receiving subsequent read requests, the storage system 210 checks whether all operations that are part of a write transaction are complete before serving the requested objects.

FIG. 5 is a diagram illustrating an example method for performing a read transaction on a storage system, in accordance with various aspects of the subject technology. Although the various steps are shown in one order, alternative steps, additional steps, or fewer steps may also be implemented. Furthermore, the steps may be performed in different orders or in parallel. The various steps described with respect are discussed in conjunction with an example scenario for illustrative purposes and is not meant to be limiting. A client 205 may transmit a request for a read transaction to the storage system 210. The read transaction may be for one or more objects stored by the storage system. The request may include a key for each object requested, and a request timestamp.

At step 505, the front end system 220 receives the request and identifies, based on the key the in the request and the mapping 225 of key or sharding ranges to storage nodes, the storage node 230 on which the requested object is stored at step 510. The front end system 220 generates object retrieval instructions and transmits the object retrieval instructions to the identified storage node 230. The object retrieval instructions may include the key for the requested object and a timestamp associated with the read transaction (e.g., the request timestamp).

The storage node 230 receives the object retrieval instructions from the front end system 220 and identifies an entry for the requested object in the key-value table 250 based on the key and the timestamp in the retrieval instructions. At step 515, the storage node 230 determines whether the requested object is associated with a transaction that includes at least one other operation on another storage node based on the entry including a transaction identifier. If there is no transaction identifier present in the entry, the requested object is not associated with a transaction involving another storage node and the object may be returned to the front end system 220 and/or the client 205. If there is a transaction identifier present in the entry, the requested object is associated with a transaction involving another storage node which may or may not be complete and the state or status of the transaction should be checked before providing the requested object.

The key-value table 300 in FIG. 3A may help illustrate with an example scenario. For example, the storage node that the requested object is stored may be storage node 1 230a. Key-value table 300 in FIG. 3A represents the key-value table for storage node 1 230a. In this scenario, row 310 of key-value table 300 represents the entry for the requested object (e.g., the object associated with key "A123") in the key-value table 300, identified based on the key and the timestamp in the retrieval instructions. The entry in row 310 includes a transaction ID of "3_55" which indicates that the requested object is associated with a transaction (e.g., transaction associated with transaction ID "3_55") that involves at least one other storage node. The state or status of the transaction should be checked to determine whether the transaction is complete or committed and the object can be provided or if the transaction has not been completed.

The state of a transaction can be tracked by finding an entry for the transaction in a transaction table 255. According to some embodiments, to select to correct transaction table 255, the storage node 230 may pass the transaction ID to the front end system 220 and the front end system 220 can identify the correct transaction node for the transaction based on the transaction map 260. In other embodiments, the correct transaction table 255 can be identified based on the transaction ID. For example, a portion of the transaction ID may specify which transaction table 255 or storage node 230 the transaction information is stored on. In the scenario illustrated by row 310 in the key-value table 300 FIG. 3A, a first portion (e.g., "3") of the transaction ID of "3_55" may indicate that the transaction information is stored on transaction table 3 or storage node 3.

Once the transaction table 255 is identified, the entry corresponding to the transaction ID (e.g., "3_55") may be retrieved. The entry in row 360 of the transaction table 350 in FIG. 3C helps to illustrate an example entry corresponding to transaction ID "3_55." Row 360 indicates that the transaction corresponding to transaction ID "3_55" is committed when timestamp or version ID "17" is completed by the nodes.

At step 520, the storage node 230a may determine the status of the entry for the key in the key-value table based on the entry for the transaction in the transaction table. For example, returning to row 310 in the key-value table 300 in FIG. 3A, row 310 indicates that object "A123" will be ready to read at timestamp 13 or when version ID 13 is completed by the storage node. However, row 310 also indicates that the value for object "A123" at timestamp/version ID 13 is tied to transaction "3_55" and the entry for transaction "3_55" (e.g., row 360 of the transaction table 350 in FIG. 3C) indicates that transaction "3_55" is ready for reading at timestamp/version ID 17. Accordingly, storage node 230a may delay providing the object associated with row 310 of FIG. 3A until the storage node 230a completes or reaches timestamp or version ID 17.

According to some embodiments, in order to save steps, time, and computing resources on subsequent requests for objects, the storage node 230a may update row 310 in the key-value table 300 in FIG. 3A to change the timestamp/version ID from 13 to 17 and remove the transaction ID "3_55." On subsequent requests for object with key "A123," the storage node 230a will not detect an association with a transaction and will not need to check the status of the transaction, while at the same time determining that object "A123" is ready to be served when storage node 230a completes or reaches timestamp or version ID 17.

At step 525, when all operations associated with timestamp or version ID 17 are completed by storage node 230a (e.g., based on a comparison of the timestamp or version ID with a complete marker for storage node 230a), storage node 230a may provide the object associated with row 310 of FIG. 3A to the front end system 220 or the client 205.

Figure 6:
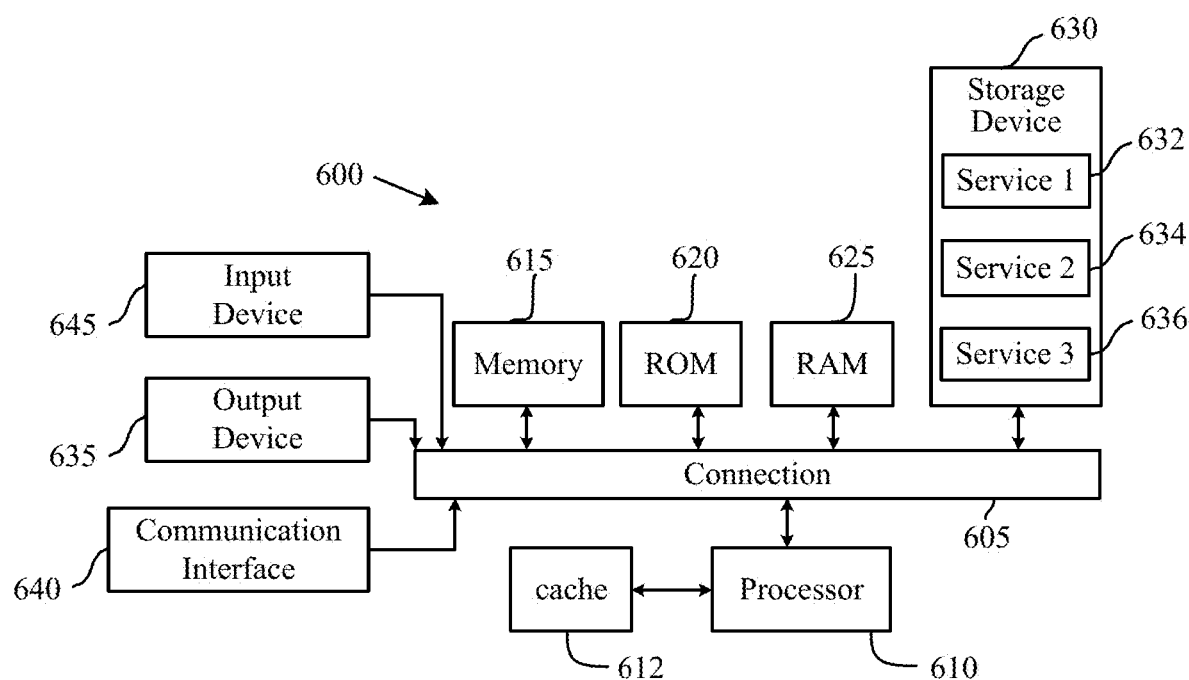
FIG. 6 shows an example system for implementing various aspects of the present technology.

FIG. 6 shows an example of computing system 600, which can be for example any computing device making up client device 150, content management system 110 or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving a request for a data object stored at a data storage system comprising a plurality of storage nodes, the request comprising a key associated with the data object and a request timestamp;
   identifying, based on the key and a mapping of keys to storage nodes, a first storage node in the plurality of storage nodes from which to read the data object;
   determining that the data object is associated with a transaction comprising at least one operation associated with a second storage node in the plurality of storage nodes, the determining based on an entry for the data object in a key-value table, wherein the entry for the data object includes the key and a transaction identifier that identifies the transaction and a transaction table;
   identifying a transaction timestamp based on a query of the transaction table using the transaction identifier;
   determining that the data object is ready to be read based on a comparison of a marker of the first storage node to the transaction timestamp; and
   providing the data object when the data object is ready to be read.

2. The method of claim 1, wherein the key-value table is stored on the first storage node.

3. The method of claim 1, wherein the key comprises a sharding value and an object identifier.

4. The method of claim 3, wherein each storage node in the plurality of storage nodes is associated with a range of sharding values.

5. The method of claim 1, further comprising identifying the transaction table from a plurality of transaction tables based on a transaction map, wherein each transaction table in the plurality of transaction tables is stored on a storage node in the plurality of storage nodes.

6. The method of claim 1, further comprising identifying the transaction table from a plurality of transaction tables based on an encoding of the transaction table in the transaction identifier.

7. The method of claim 1, further comprising:
   identifying a data object timestamp from the entry for the data object; and
   determining that the data object is ready to be read based on a comparison of the marker of the first storage node to the data object timestamp.

8. The method of claim 1, further comprising:
   updating a data object timestamp in the entry for the data object with the transaction timestamp.

9. A non-transitory computer-readable medium comprising instructions that, when executed by one or more processors, cause a computing device to:
   receive a request to perform a transaction to write data to a data storage system comprising a plurality of storage nodes, wherein the transaction comprises at least a first write operation on a first storage node in the plurality of storage nodes and a second write operation on a second storage node in the plurality of storage nodes;
   create, for the first write operation, a first entry in a first key-value table, wherein the first entry includes a transaction identifier that identifies the transaction and a transaction table;
   create, for the second write operation, a second entry in a second key-value table, wherein the second entry includes the transaction identifier;
   create, for the transaction, a third entry in the transaction table, wherein the third entry includes the transaction identifier;
   perform the first write operation on the first storage node and the second write operation on the second storage node;
   in response to a read request to read a data object associated with the data, identify a transaction timestamp by querying the transaction table using the transaction identifier;
   determine that the data object is ready to be read based on a comparison of a marker of the first storage node to the transaction timestamp; and
   provide the data object when the data object is ready to be read.

10. The non-transitory computer-readable medium of claim 9, wherein the first key-value table is stored on the first storage node and the second key-value table is stored on the second storage node.

11. The non-transitory computer-readable medium of claim 9, wherein the instructions further cause the computing device to:
identify the first storage node and the second storage node for handling the request to write data to the data storage system based on a mapping of key ranges to storage nodes.

12. The non-transitory computer-readable medium of claim 9, wherein the first entry further includes a first timestamp generated by the first storage node, and wherein the second entry further includes a second timestamp generated by the second storage node.

13. The non-transitory computer-readable medium of claim 9, wherein the first write operation comprises an operation to write metadata associated with a content item.

14. A distributed storage system comprising:
a plurality of storage nodes; and
at least one front end device including at least a first processor configured to:
receive a request for a data object from a client device, the request comprising a key associated with the data object, and
identify, based on the key and a mapping of keys to storage nodes, a first storage node in the plurality of storage nodes from which to read the data object; and
wherein the first storage node including at least a second processor in the plurality of storage nodes is configured to:
determine that the data object is associated with a transaction comprising at least one operation associated with a second storage node in the plurality of storage nodes, the determining based on an entry for the data object in a key-value table, wherein the entry for the data object includes the key and a transaction identifier that identifies the transaction and a transaction table;
identify a transaction timestamp based on a query of the transaction table using the transaction identifier;
determine that the data object is ready to be read based on a comparison of a marker of the first storage node to the transaction timestamp; and
provide the data object when the data object is ready to be read.

15. The distributed storage system of claim 14, wherein the first storage node is further configured to:
identify the transaction identifier in the entry for the data object in the key-value table indicating that the data object is associated with the transaction comprising at least one operation associated with the second storage node in the plurality of storage nodes;
wherein the data object is ready to be read based on a status of the at least one operation.

16. The distributed storage system of claim 15, wherein the key-value table is stored on the first storage node.

17. The distributed storage system of claim 15, wherein the front end device is further configured to identify the transaction table from a plurality of transaction tables based on an encoding of the transaction table in the transaction identifier.

18. The distributed storage system of claim 15, wherein the first storage node is further configured to:
update a data object timestamp in the entry for the data object with the transaction timestamp.

19. The distributed storage system of claim 14, wherein the at least one front end device and the plurality of storage nodes are a part of a content management system.

* * * * *